May 14, 1935. D. B. KNIGHT 2,001,143
INTERMITTENT ABSORPTION REFRIGERATING APPARATUS
Filed March 18, 1931
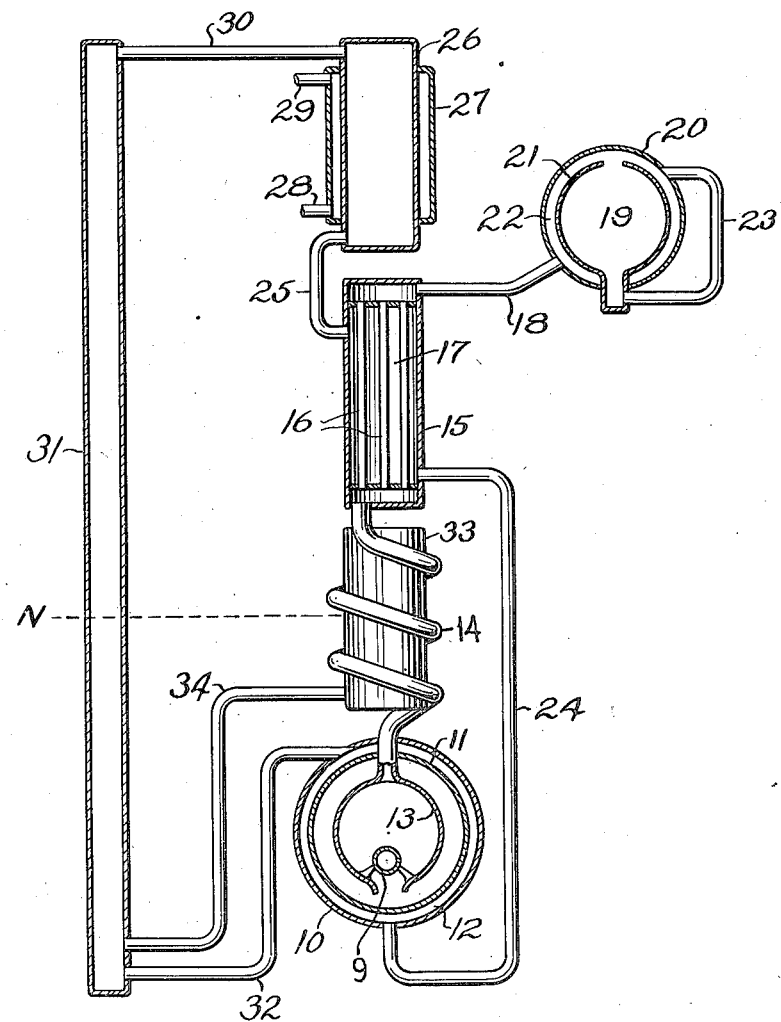
INVENTOR.
D. B. Knight
BY
ATTORNEY Patented May 14, 1935

2,001,143

UNITED STATES PATENT OFFICE 2,001,143

INTERMITTENT ABSORPTION REFRIGERATING APPARATUS

Donald B. Knight, Brooklyn, N. Y., assignor to Electrolux Servel Corporation, New York, N. Y., a corporation of Delaware Application March 18, 1931, Serial No. 523,395

12 Claims. (Cl. 62—118)

This invention relates to refrigerating apparatus of the intermittent absorption type.

In refrigeration apparatus of this type, a refrigerant fluid is expelled from an absorbent by heat during a period variously referred to as a heating or generating period. During this period, the expelled refrigerant vapor is condensed to liquid and the liquid refrigerant accumulated in an evaporator or reservoir. After distillation of the desired amount of refrigerant, the heating is discontinued and the absorbent cooled, whereby the pressure in the system is lowered to initiate what is variously referred to as the refrigeration or absorption period. During this period, liquid refrigerant evaporates in the reservoir or evaporator and is absorbed into the absorbent from which it was previously distilled. A suitable cooling medium, such as water or air, is utilized to remove the heat of condensation during the generating period, and to remove the heat of absorption during the refrigeration period. When a liquid absorbent is used, distillation of the refrigerant may be accompanied by distillation of some absorbent which, having a higher boiling point than the refrigerant, does not vaporize during the refrigeration period and therefore accumulates in the reservoir or evaporator.

An object of this invention is to provide, in an apparatus of this type, for the return of any absorption liquid which may have passed the rectifier during the generating cycle to the generator-absorber from the evaporator along with the refrigerant so that it does not collect in the evaporator throughout successive cycles.

A further object of this invention is to provide for delivering liquid refrigerant to the evaporating surfaces responsive to the amount of cooling required, that is, the difference in temperature between the medium to be cooled and the boiling point of the refrigerant.

These objects are attained, in general, by providing a novel apparatus in which a generator-absorber, a condenser, an evaporator, and a receiver are connected in series respectively and arranged for drainage of liquid by gravity from the evaporator through said condenser into the generator-absorber. The condenser comprises conduits of such size that gas and liquid cannot pass each other therein whereby, during the generating period liquid formed in the condenser must accumulate upwardly and flow into the receiver. A thermosyphon is provided for delivering liquid from the receiver to the evaporator during the refrigeration period responsive to the temperature of the medium to be cooled.

A fuller understanding of my invention may be had and the objects and advantages thereof will be apparent from the following description taken in connection with the accompanying drawing in which the figure shows schematically a refrigerating apparatus of the intermittent absorption type contemplated by this invention.

In the figure, the generator comprises a hollow wall formed by an outer shell 10 and a concentric inner shell 11 spaced apart and enclosing an annular chamber 12. Within the generator is disposed a vessel 13 spaced from the shell 11 and open at the bottom to the interior of the generator. Within the vessel 13 and adjacent the bottom thereof is a heating means 9 which may be of any suitable type such as a flue or electric heating element. The top of the vessel 13 is connected through a rectifier 14 to the condenser 15. The latter consists of a plurality of small vertical pipes 16 connected to a header at each end and surrounded by an outer casing enclosing a fluid tight chamber 17 through which the tubes extend. The rectifier 14 is connected to the lower header of the condenser and the upper header is connected through pipe 18 to the evaporator 19. The latter consists of an outer casing 20 within which is disposed a concentric vessel 21, open at the top and forming an annular space 22 with the outer casing 20. The lower part of the vessel 21 is connected to the upper part of the annular space by a pipe 23 located outside of the evaporator. The lower portion of the vessel 21 may be extended through the casing 20, as illustrated, to provide a connection for the pipe 23.

Before heat is supplied, the solution of refrigerant in absorption liquid is at the same level within the vessel 13 as in the generator. During the heating or generating cycle, refrigerant gas generated outside of the vessel 13 cannot escape and accumulates in the upper part of the generator under the top of the inner shell 11. Due to the pressure of this accumulated gas, the liquid outside of vessel 13 is depressed and forced upwardly into the vessel until the gas bubbles upwardly through the opening in the bottom. In rectifier 14, due to the surface exposed to the cooling effect of air, any absorption liquid vapor is condensed from the refrigerant gas and flows back to the generator by gravity. The refrigerant gas flows upwardly from the rectifier into the condenser 15 where it condenses within the tubes 16 due to the heat transfer to the cooling medium flowing in chamber 17 around these tubes, and, due to the gas pressure from below, the condensed refrigerant is forced upwardly out of the condenser through the pipe 18 into the evaporator where it is forced upwardly in the clearance space 22 between the inner vessel 21 and the casing 20 into the opening in the top of the vessel 21, which latter acts as a receiver or reservoir for collecting the condensate during the generating cycle.

The above described flow of liquid refrigerant from the condenser 15 upwardly into the evaporator-receiver 19 is due to the gas pressure below the liquid which forms by condensation in the condenser. The small condenser tubes 16 are of such diameter, depending on the refrigerant utilized, that gas and liquid cannot pass each other therein, wherefore the increasing quantity of liquid formed by condensation in the upper part of the condenser tubes cannot flow downwardly therein, and must therefore accumulate upwardly until overflow occurs into the inner shell 21 of the evaporator, as previously described.

As the end of the generating cycle, when substantially all of the refrigerant has been expelled from solution in the generator, the heat input is interrupted by a thermostat responsive to generator temperature, or any other suitable means. As the temperature in the generator decreases, the pressure above the liquid refrigerant in the evaporator decreases and vaporization occurs, absorbing heat from the surrounding medium. The vapor from the evaporator passes through pipe 18, condenser 15, rectifier 14 and back to the generator, entering the top of vessel 13. In the latter, the gas pressure forces the weak absorption liquid downwardly through the opening in the bottom of the vessel 13 and into the space between the latter and the inner shell 11. When all the liquid is forced out of the vessel 13, the gas passes through the opening in the bottom and bubbles through the absorption liquid, insuring rapid absorption. During this refrigerating cycle, the generator-absorber is cooled by fluid in the annular space 12 as hereinafter set forth.

In the evaporator, refrigerant liquid reaches the same level in the pipe 23 as within the vessel 21 and as the pressure within the apparatus decreases below that corresponding to the temperature surrounding this pipe, that is, the temperature of the medium to be cooled, boiling occurs in this pipe and, since it is of small diameter, slugs of refrigerant vapor are pumped up this pipe and into the clearance space 22 between the vessel 21 and the casing 20. In this manner, dependent upon the heat transferred to the pipe 23, liquid refrigerant is delivered by thermosyphon action to the clearance space 22 wherein, because of its extended surface in heat exchange relation with the medium to be cooled, refrigerant liquid is delivered to the evaporating surfaces responsive to the amount of cooling required, that is, the difference in temperature between the medium to be cooled and the boiling point of the refrigerant. Also by this means, any absorption liquid which may have passed the rectifier during the generating cycle is returned to the generator along with the evaporated refrigerant and does not collect in the evaporator throughout successive cycles.

Cooling of this apparatus is preferably effected, as shown, by a secondary refrigerant or cooling fluid circulated through the following described secondary cooling system. The lower part of the annular space 12 in the outer wall of the generator is connected by a pipe 24 to the lower part of chamber 17 around the condenser tubes 16. The upper part of chamber 17 is connected by a pipe 25 to a condenser 26 located above the primary condenser. The condenser 26 is cooled by water circulating through jacket 27 entering the latter through pipe 28 and discharging through pipe 29. The upper part of condenser 26 is connected by a pipe 30 with a top of a stand pipe or column 31 which extends the full height of the apparatus. The upper part of the annular space 12 in the outer wall of the generator is connected through pipe 32 to the lower part of the stand pipe 31. Associated in heat exchange relation with the rectifier 14 is a fluid tight vessel 33 which is also connected at its lower portion with the bottom of stand pipe 31 through pipe 34. A convenient way of associating the rectifier 14 and the vessel 33 is to form the rectifier as a coil around the vessel, as shown.

When the unit is not in operation, secondary liquid refrigerant fills the annular space 12 in the outer wall of the generator pipes 32 and 34 and stands to the level N in pipe 24, vessel 33 and stand pipe 31. When the cooling water is turned on in jacket 27 of the condenser 26, the temperature is reduced in this part of the system and the pressure is lowered so that the liquid in the lower part of the system boils. The gas formed in the vessel 33 forces liquid from the latter through pipe 34 into the stand pipe 31, raising the liquid level in the latter. Gas formed in the annular space 12 in the outer wall of the generator tends to force liquid through both pipes 32 and 24, but on account of the liquid column in the stand pipe 31, liquid is forced through the pipe 24 into chamber 17 of the condenser 15 to balance the liquid column in the stand pipe. When the unit is placed in operation, the rectifier 14 keeps the vessel 33 warm, thus preventing any liquid from returning to the vessel during the generating cycle. The heat of condensation boils the secondary refrigerant in the condenser 15 and the resulting vapor rises through pipe 25 into the condenser 26 where it is liquefied, flowing back to the primary condenser through the same pipe 25.

When the generating cycle is completed, the input at 9 is turned off and the generator cools by radiation and the cool vapor from the primary evaporator passing to the generator through rectifier 14 cools the latter, causing condensation of the secondary refrigerant to take place, whereupon the vessel is refilled with refrigerant liquid from the stand pipe 31 through pipe 34. As the liquid level in the stand pipe 31 decreases, the secondary refrigerant in the condenser 15 flows back through pipe 24 into the space 12 in the outer wall of the generator. Heat of absorption boils the liquid in the outer wall of the generator-absorber and the vapors pass through the pipe 32 upwardly through the stand pipe 31 into the secondary condenser 26 where it is condensed flowing back to the space in the outer wall of the generator through pipe 25, primary condenser 15 and pipe 24.

When the primary liquid refrigerant in the evaporator is exhausted at the end of the refrigerating cycle, no vapor passes through the rectifier 14 around the vessel 33, allowing the latter to warm up to room temperature. Also, the heat of absorption in the generator ceases, so that, relieved of this load, the secondary condenser 26 cools down to a temperature lower than that of the vessel 33, whereupon the secondary refrigerant in the latter boils, forcing liquid into the stand pipe 31, as previously described, and the liquid in the outer wall of the generator is forced through pipe 24 into the primary condenser 15. The heater 9 is now turned on and the process repeated. A more positive action may be assured by additional heating of the vessel 33 during the generating cycle, as by a small gas flame, which also makes it independent of room temperatures as well as adapting the system to air cooling of the secondary condenser.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. In refrigerating apparatus of the intermittent absorption type, a generator-absorber comprising inner and outer spaced shells, the inner shell being open at the bottom, heating means within the inner of said shells, means for cooling said generator-absorber, a condenser above said generator-absorber and comprising a plurality of small vertical tubes connected at each end by a header, means for cooling said condenser, an analyzer connected between the lower header of said condenser and the top of said inner shell of the generator-absorber, and an evaporator above said condenser comprising two concentric spaced shells, the inner shell being open at the top and having a pipe connecting the bottom thereof to the upper part of the space between the shells, said pipe being exterior of the outer shell, and the lower part of the space between the shells being connected to the upper header of said condenser.

2. In intermittent absorption refrigerating apparatus, a generator-absorber comprising an outer casing and a vessel within said casing, spaced therefrom and open at the bottom, heating means within said vessel, a condenser above said generator and comprising one or more small vertical tubes, means for cooling said condenser, and an evaporator above said condenser comprising two spaced shells, the inner shell being open at the top and having means connecting the bottom thereof to the upper part of the outer shell, said means extending outside of the latter, and the space between the shells being connected to said condenser.

3. In refrigerating apparatus of the intermittent absorption type, an evaporator comprising a fluid tight casing, a vessel within said casing open at the top and having a lower portion extending through said casing and a thermosyphon conduit exterior of said casing connecting the said lower part of the vessel and the upper part of said casing.

4. Refrigerating apparatus of the intermittent absorption type including a generator-absorber, condenser, and evaporator spaced vertically respectively, said evaporator comprising a casing, a vessel within said casing open at the top, and means exterior of said casing connecting the bottom of said vessel to the upper part of said casing.

5. In absorption refrigerating apparatus of the intermittent type, an evaporator comprising a pair of spaced shells, the inner shell being open at the top, and a thermosyphon conduit exterior of the outer shell connected from the bottom of the inner shell to the upper part of the space between said shells.

6. Refrigerating apparatus of the intermittent absorption type including a generator-absorber, a condenser above said generator-absorber comprising one or more vertical tubes, and an evaporator above said condenser including a liquid trap.

7. In refrigerating apparatus, an evaporator comprising a pair of spaced shells, means for supplying liquid refrigerant within the inner shell, and a thermo-syphon pump supplied with liquid from the bottom of the inner shell connected to discharge into the upper part of the space between the shells, said pump adapted to be operated by heat absorbed from the medium to be cooled.

8. In the art of refrigeration, heating a solution of refrigerant gas in an absorbent to expel the gas therefrom, condensing the gas to a liquid, applying the pressure of the gas before condensation to force the liquid above the level at which it is condensed, accumulating the liquid above this level in heat insulated relation with the medium to be cooled, reducing the pressure above the accumulated liquid, absorbing heat from a medium to be cooled to pump the accumulated liquid into heat exchange relation with the medium, further absorbing heat from the latter to vaporize the liquid, and absorbing the vapor in the absorbent from which it was expelled.

9. In refrigeration apparatus of the intermittent absorption type, a generator-absorber, a condenser, and an evaporator connected in series respectively and arranged for drainage of liquid by gravity from said evaporator through said condenser into said generator-absorber, said condenser comprising one or more conduits of such size that gas and liquid cannot pass each other therein.

10. In refrigeration apparatus of the intermittent absorption type, a generator-absorber, a condenser, an evaporator, and a receiver connected in series respectively and arranged for drainage of liquid by gravity from said evaporator through said condenser into said generator-absorber, said condenser comprising one or more conduits of such size that gas and liquid cannot pass each other therein, and means for delivering liquid from said receiver to said evaporator responsive to the temperature of the medium to be cooled.

11. In absorption refrigeration apparatus of the intermittent type, an evaporator, a receiver within said evaporator, and a thermosyphon conduit for delivering liquid from said receiver to said evaporator and extending outside of the latter.

12. A refrigeration system including an evaporator, a receiver, a condenser, apparatus for causing alternate expulsion and absorption of refrigerant fluid with respect to an absorbent therefor, said condenser being connected to receive expelled refrigerant vapor, means to conduct condensed refrigerant liquid from said condenser to said receiver, said evaporator being connected for flow of refrigerant vapor therefrom to said absorption apparatus, and a thermosyphon for delivering liquid from said receiver to said evaporator.

DONALD B. KNIGHT.